United States Patent Office 3,672,851
Patented June 27, 1972

---

3,672,851
GELLED ALCOHOL FUEL CONTAINING NITROCELLULOSE AND BORIC ACID
Joseph M. Ihm, 1481 W. 64th Ave., Vancouver 14, British Columbia, Canada
No Drawing. Continuation-in-part of application Ser. No. 741,219, June 28, 1968. This application Apr. 26, 1971, Ser. No. 137,658
Int. Cl. C101 7/04
U.S. Cl. 44—7 B                                                   4 Claims

ABSTRACT OF THE DISCLOSURE

A solid alcohol fuel gel having improved storage and burning properties comprising an alcoholic fuel gel which is a gelled solution of high viscosity nitrocellulose in methyl alcohol, said gel containing boric acid in an amount sufficient to stabilize said gel.

---

This application is a continuation-in-part of Ser. No. 741,219 filed June 28, 1968, now abandoned.

The present invention relates to an alcohol fuel gel and in particular to such an alcohol fuel gel which is simple to manufacture and has improved storage stability and burning properties.

Solid alcohol fuel comprising a gel of nitrocellulose in a lower aliphatic alcohol such as methyl alcohol and ethyl alcohol and mixtures thereof are well known and such solid fuel otherwise known as gallertes, have found application as a safe versatile portable source of heat which may be used for example at camp sites, in restaurants and in hotels.

Alcohol fuel gels have heretofore usually been prepared by adding to a saturated solution of nitrocellulose in the lower aliphatic alcohol a miscible non-solvent for nitrocellulose such as water to upset the solvent-solute equilibrium and thus bring down the nitrocellulose to form a gel. Such procedures are disclosed for example in U.S. Pats. Nos. 1,993,517, 1,995,911 2,721,120 and 2,102,005. However, as will be seen from the disclosures of these patents the mixing of water with the alcoholic solution of nitrocellulose is extremely critical and in order to obtain a useful alcoholic fuel gel complicated procedures are followed to effect such mixing. Further the properties of the alcohol fuel gel cell so produced are dependent upon many factors in the process of manufacture such as the temperature, particular solvent and concentration of the nitrocellulose in the solvent and heretofore the alcohol fuel gels produced by these processes in addition to the difficulty of manufacture have been found to suffer from a number of disadvantages and in particular to be unstable on storage undergoing syneresis, to have undesirable burning properties and to leave undesirable residues on burning.

Attempts have been made to overcome these disadvantages by adding various substances to the gel during its formation. Such attempts have been disclosed inter alia in U.S. Pats. Nos. 2,001,070, 2,046,209, 2,207,895, 2,504,-196, 3,174,832, 3,214,252, 3,271,120 and 3,342,569. Although some success has been achieved by the addition of such substances, no commercially satisfactory alcohol fuel gel has yet been found which at the same time is stable under storage i.e. does not liquefy on prolonged storage at temperatures in the range 75 to 100° F., has good burning properties, i.e. does not undergo substantial sputtering and crackling during its burning, does not leave substantial residue upon burning and provides sufficient heat during such burning.

The present invention provides an alcohol fuel gel which is essentially stable under prolonged storage i.e. does not undergo syneresis to any substantial extent, burns evenly without any substantial melting and upon completion of said burning leaves essentially no residues and further is simple to prepare requiring no critical mixing technique as required in preparing the alcohol fuel gels of the prior art.

According to the present invention therefore there is provided a process for the production of an alcohol fuel gel which comprises adding to a solution of a high viscosity nitrocellulose in methyl alcohol an aqueous solution of boric acid, said nitrocellulose being present in said alcoholic solution in a concentration from 3 to 10% by weight and said boric acid being added to said alcoholic solution to provide a concentration from 0.02 to 0.025% by weight.

The present invention also provides an alcohol fuel gel produced by said process which is gelled solution of a high viscosity nitrocellulose in methyl alcohol, said gel containing 3 to 10% by weight of said nitrocellulose and from 0.02 to 0.025% by weight of said boric acid.

In the process of the present invention the alcoholic solution of nitrocellulose has a relatively low content of the nitrocellulose in the range 3 to 10% by weight and more preferably 4 to 8% by weight. An alcoholic solution containing less than about 3% of the nitrocellulose cannot be transformed into a stable durable gel suitable as an alcoholic fuel gel by the process of the present invention. With a concentration of above about 10% by weight a very thick paste is produced which may be considered a solid alcohol fuel. However, such a solid alcohol fuel burns rapidly due to the high nitrocellulose content and as such is not useful. Further the cost of such a solid alcohol fuel is too high to be economical. The nitrocellulose must be a high viscosity nitrocellulose, a particularly useful high viscosity nitrocellulose being a water soluble nitrocellulose supplied under the trademark Dynamit Nobel No. 868.

The boric acid is essentially present as a gelling agent or coagulating agent and is added as an aqueous solution in an amount sufficient to form a gel with the solution of the nitrocellulose in the methyl alcohol. The amount of boric acid added is critical to the production of the alcoholic fuel of the present invention and is added in an amount to provide a concentration of from 0.02 to 0.025% by weight. If less than 0.02% by weight is present the resulting gel is not sufficiently firm to serve as the fuel. If more than 0.025% is present, while providing a firm gel part of the alcohol is liberated and the gel tends to revert to the liquid state on storage, i.e. undergo syneresis. Boric acid is critical as the coagulating agent for the alcoholic fuel gel as the use of other mineral acids such as sulphuric and hydrochloric acid do not have the same effect as boric acid in forming the gel, some acids tending to destroy the nitrocellulose or precipitate a melange of cellulose and nitrocellulose.

The alcohol for forming the solution of the nitrocellulose is methyl alcohol as it is readily available, is cheap and readily dissolves the nitrocellulose in a sufficient amount without requiring further addition to the methyl alcohol. Other alcohols such as ethyl alcohol necessitates the addition of ether in order to dissolve the nitrocellulose which ether is either lost during the process or is recovered by a complicated relatively expensive procedure.

The present invention will be further illustrated by way of the following examples.

EXAMPLE 1

Four grams of a high viscosity nitrocellulose supplied under the trademark Dynamit Nobel No. 868 was dissolved in 100 cc. of methyl alcohol to produce a highly viscous solution thereof. To this solution was slowly added with constant stirring 2 cc. of a 1% aqueous solution of boric acid to produce a very thick paste, which upon being lighted burns quietly giving out great heat and leaves substantially no residue subsequent to burning. The paste is stable on storage over large periods of time without any substantial syneresis occurring.

EXAMPLE 2

In a similar manner to Example 1, the following ingredients were mixed in the following proportions:

100 cc. of methyl alcohol
6 grams of nitrocellulose (same as in Example 1)
2 cc. of a 1% aqueous solution of boric acid.

A similar alcohol fuel gel to that in Example 1 was obtained.

EXAMPLE 3

In a similar manner to Example 1, the following ingredients were mixed in the following proportions:

100 cc. of methyl alcohol
6 grams of nitrocellulose (same as in Example 1)
2.5 cc. of a 1% aqueous solution of boric acid.

An alcohol fuel gel similar to that in Example 1 was obtained.

EXAMPLE 4

In a similar manner to Example 1, the following ingredients were mixed in the following proportions:

3780 cc. of methyl alcohol
150 grams of nitrocellulose (same as in Example 1)
75 cc. of a 1% aqueous solution of boric acid.

An alcohol fuel gel similar to that in Example 1 was obtained.

EXAMPLE 5

In a similar manner to Example 1, the following ingredients were mixed in the following proportions:

3780 cc. of methyl alcohol
300 grams of nitrocellulose (same as in Example 1)
56 cc. of a 1% aqueous solution of boric acid.

An alcohol fuel gel similar to that in Example 1 was obtained.

EXAMPLE 6

In a similar manner to Example 1, the following ingredients were mixed in the following proportions:

3780 cc. of methyl alcohol
250 grams of nitrocellulose (same as in Example 1)
150 cc. of a 1% aqueous solution of boric acid.

An alcohol fuel gel similar to that in Example 1 was obtained.

I claim:

1. A process for the production of an alcohol fuel gel which comprises adding to a solution of a high viscosity nitrocellulose in methyl alcohol an aqueous solution of boric acid, said nitrocellulose being present in said alcoholic solution in a concentration from 3 to 10% by weight and said boric acid being added to said alcoholic solution to provide a concentration from 0.02 to 0.025% by weight.

2. A process as claimed in claim 1 in which the nitrocellulose is present in the alcoholic solution in a concentration from 4 to 8% by weight.

3. An alcoholic fuel gel which is a gelled solution of a high viscosity nitrocellulose in methyl alcohol, said gel containing 3 to 10% by weight of said nitrocellulose and from 0.02 to 0.025% by weight of said boric acid.

4. A gel as claimed in claim 3 containing 4 to 8% by weight of said nitrocellulose.

References Cited

UNITED STATES PATENTS

| | | | |
|---|---|---|---|
| 3,342,569 | 9/1967 | Corey et al. | 149—94 |
| 3,271,120 | 9/1966 | Corey | 149—94 |
| 2,102,005 | 12/1937 | Jones et al. | 44—7 B |
| 1,995,911 | 3/1935 | Wysocki et al. | 44—7 B |
| 1,836,264 | 12/1931 | McBurney et al. | 44—7 B |

BENJAMIN R. PADGETT, Primary Examiner

U.S. Cl. X.R.

44—7 C; 149—18, 94